(12) United States Patent
Cheiky et al.

(10) Patent No.: US 6,806,681 B1
(45) Date of Patent: Oct. 19, 2004

(54) BATTERY HOLDER

(75) Inventors: Michael Cheiky, Santa Barbara, CA (US); Robert B. Nimocks, Santa Barbara, CA (US)

(73) Assignee: Zinc Matrix Power, Inc., Santa Barbara, CA (US)

( * ) Notice: Subject to any disclaimer, the term of this patent is extended or adjusted under 35 U.S.C. 154(b) by 124 days.

(21) Appl. No.: 10/136,793

(22) Filed: Apr. 30, 2002

(51) Int. Cl.[7] .......................... H02J 7/00; H04N 5/225; G03B 7/26; G03B 17/02

(52) U.S. Cl. ................. 320/107; 348/372; 396/301; 396/539

(58) Field of Search ..................... 320/107, 110, 320/112, 114; 429/7, 27, 96–100, 123; 361/380–399; 396/277–278, 439, 535, 539, 301; 348/372

(56) References Cited

U.S. PATENT DOCUMENTS

| | | | |
|---|---|---|---|
| 4,007,470 A | 2/1977 | Land ........................... | 396/423 |
| 4,041,514 A | 8/1977 | Johnson ....................... | 396/539 |
| 4,146,682 A | 3/1979 | Nakao .......................... | 429/97 |
| 4,153,362 A | 5/1979 | Dietz et al. .................. | 396/423 |
| 4,409,645 A | 10/1983 | Sloan ........................... | 362/200 |
| 4,464,031 A | 8/1984 | Iwashita et al. ............. | 396/388 |
| 4,676,617 A * | 6/1987 | Buirley et al. ................ | 396/14 |
| 4,806,440 A | 2/1989 | Hahs et al. | |
| 5,015,546 A | 5/1991 | Dulaney et al. .............. | 429/99 |
| 5,153,817 A * | 10/1992 | Hosoi et al. ................. | 361/393 |
| 5,217,824 A | 6/1993 | Womack ....................... | 429/96 |
| 5,293,300 A * | 3/1994 | Leung ......................... | 361/683 |
| 5,325,143 A | 6/1994 | Kawano ....................... | 396/59 |
| 5,517,277 A | 5/1996 | Goto et al. .................. | 396/281 |
| 5,536,590 A * | 7/1996 | Cheiky ........................ | 429/7 |
| 5,654,870 A | 8/1997 | Havener ...................... | 361/600 |
| 5,784,105 A | 7/1998 | Kawamura ................... | 348/372 |
| 5,945,235 A | 8/1999 | Clanton et al. .............. | 429/98 |
| 6,071,639 A | 6/2000 | Bryant et al. ................ | 429/97 |
| 6,169,857 B1 | 1/2001 | Kaneko ....................... | 396/301 |
| 6,225,777 B1 | 5/2001 | Garcia et al. ............... | 320/112 |
| 6,247,962 B1 | 6/2001 | DeSorbo ...................... | 439/500 |
| 6,266,491 B1 * | 7/2001 | Carducci et al. ............ | 396/539 |
| 6,271,644 B1 | 8/2001 | Okada et al. ............... | 320/112 |
| 6,326,767 B1 | 12/2001 | Small et al. ................. | 320/116 |

* cited by examiner

*Primary Examiner*—Pia Tibbits
(74) *Attorney, Agent, or Firm*—Marvin E. Jacobs

(57) ABSTRACT

An increased capacity battery holder, which allows a device to be used for a longer time duration than can be achieved from solely internally contained batteries, capable of providing additional energy to the device, beyond internal space and volume limitations of the device, having additional battery holding capacity external to the device, with the additional battery holding capacity self contained within the battery holder. The battery holder provides maximum energy output, a portion of the battery holder being matingly removably attachable and optionally removably lockable to the device. The battery holder is safe, of simple construction, easy to install and remove therefrom the device, acts as an additional means for holding and/or handling the device, and is capable of forming an integral assembly with the device. The battery holder has means for preventing inadvertent shorting and/or reversing polarity of the batteries, and optionally recharging means for recharging the batteries.

27 Claims, 8 Drawing Sheets

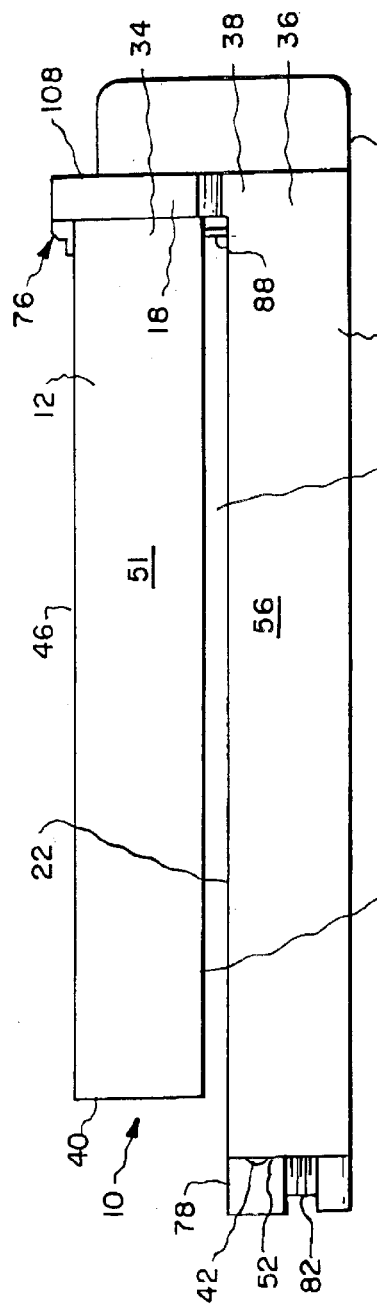
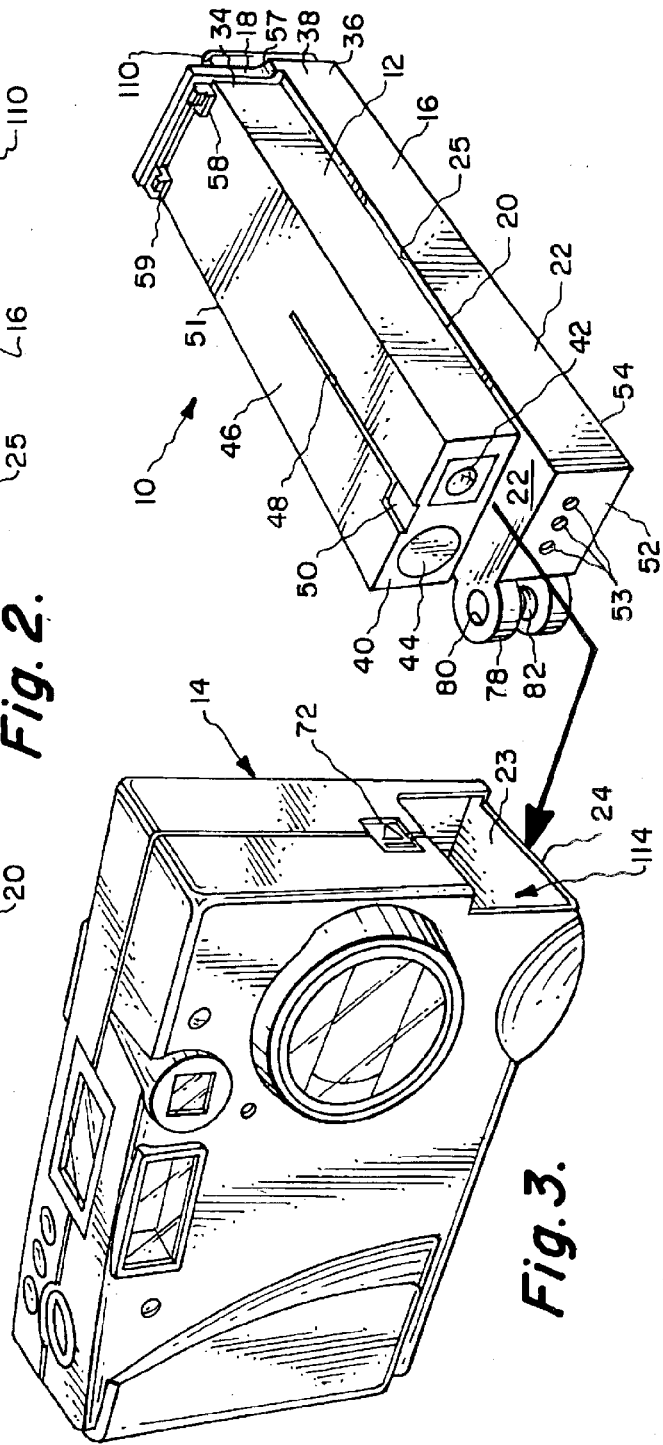

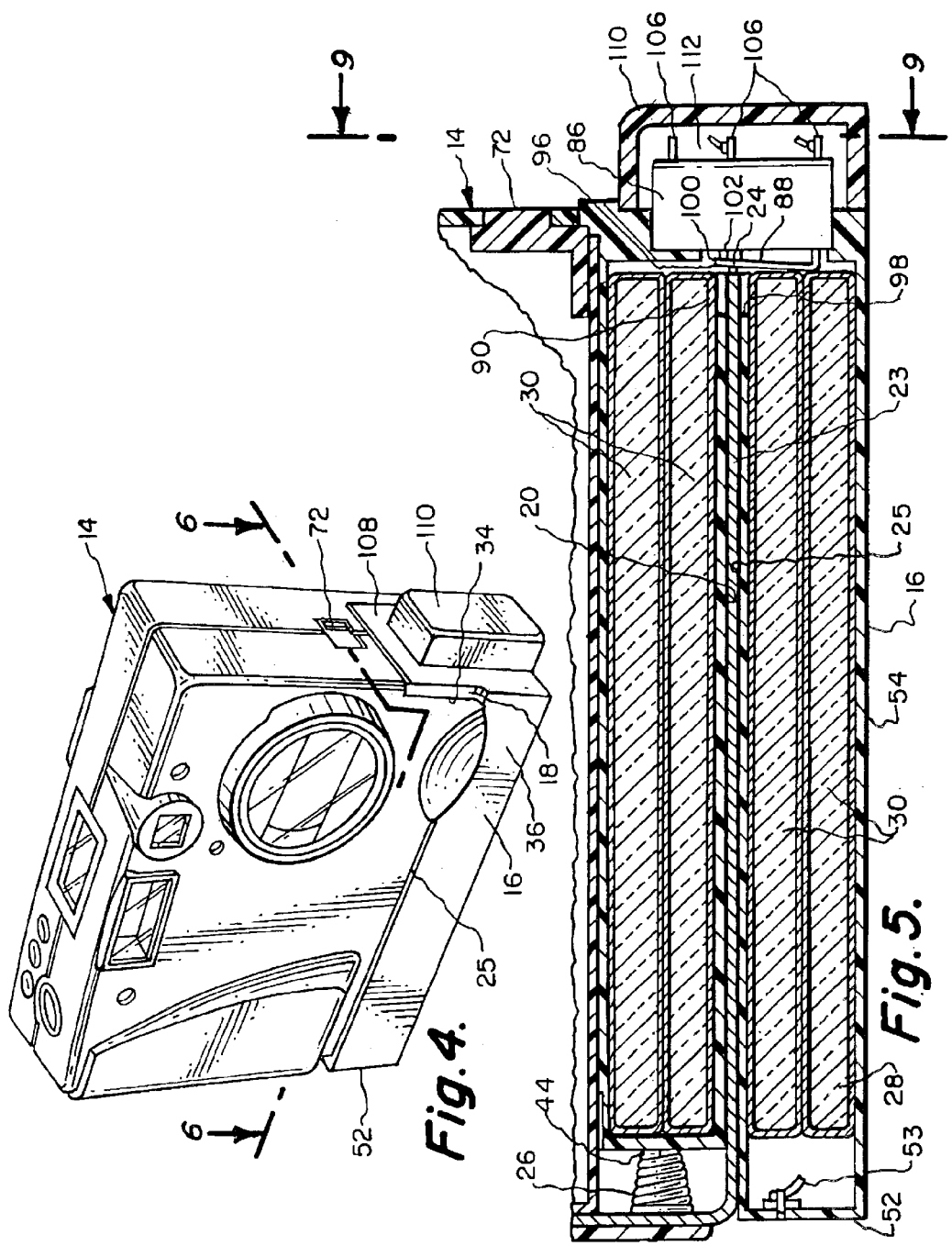

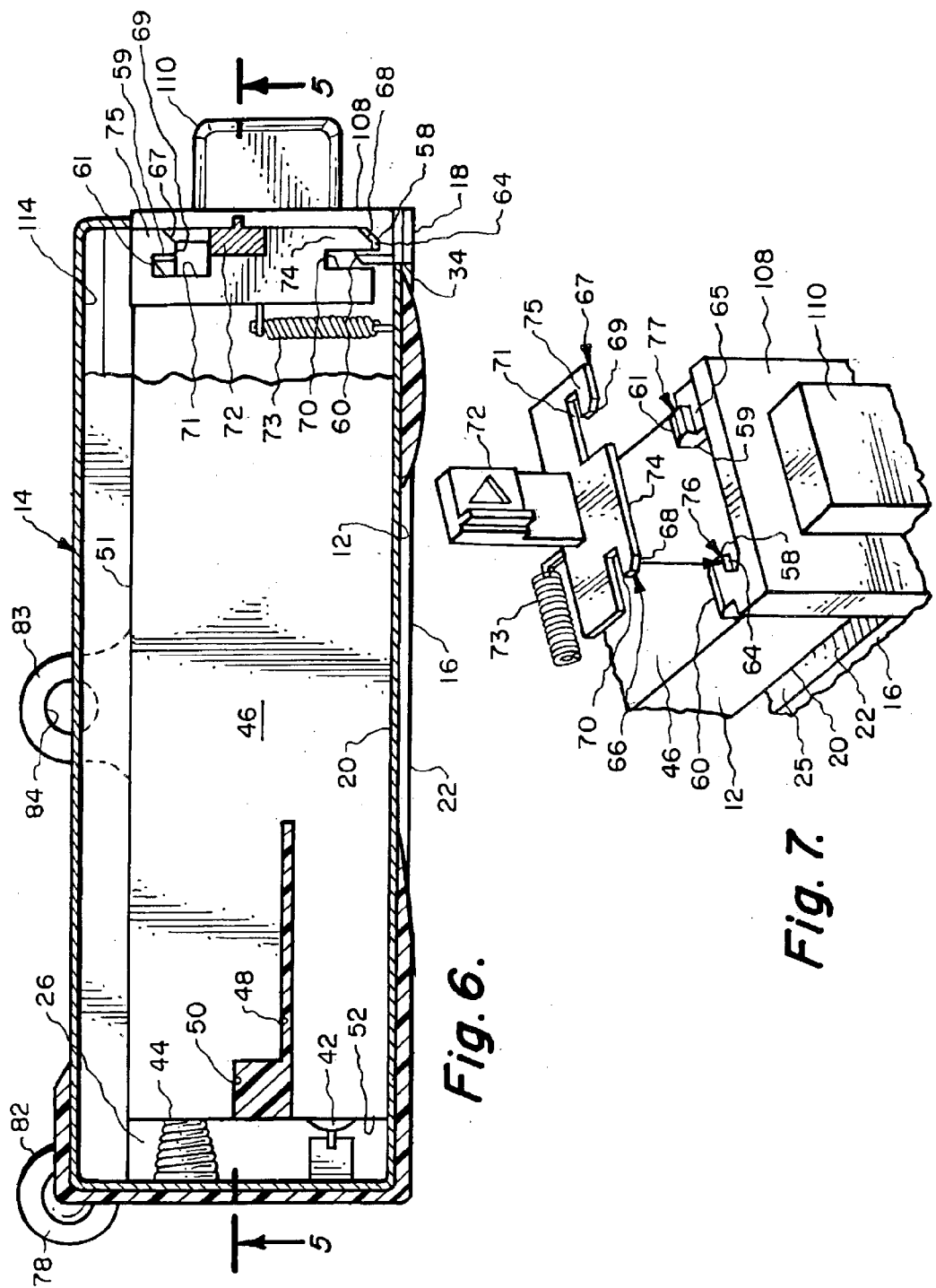

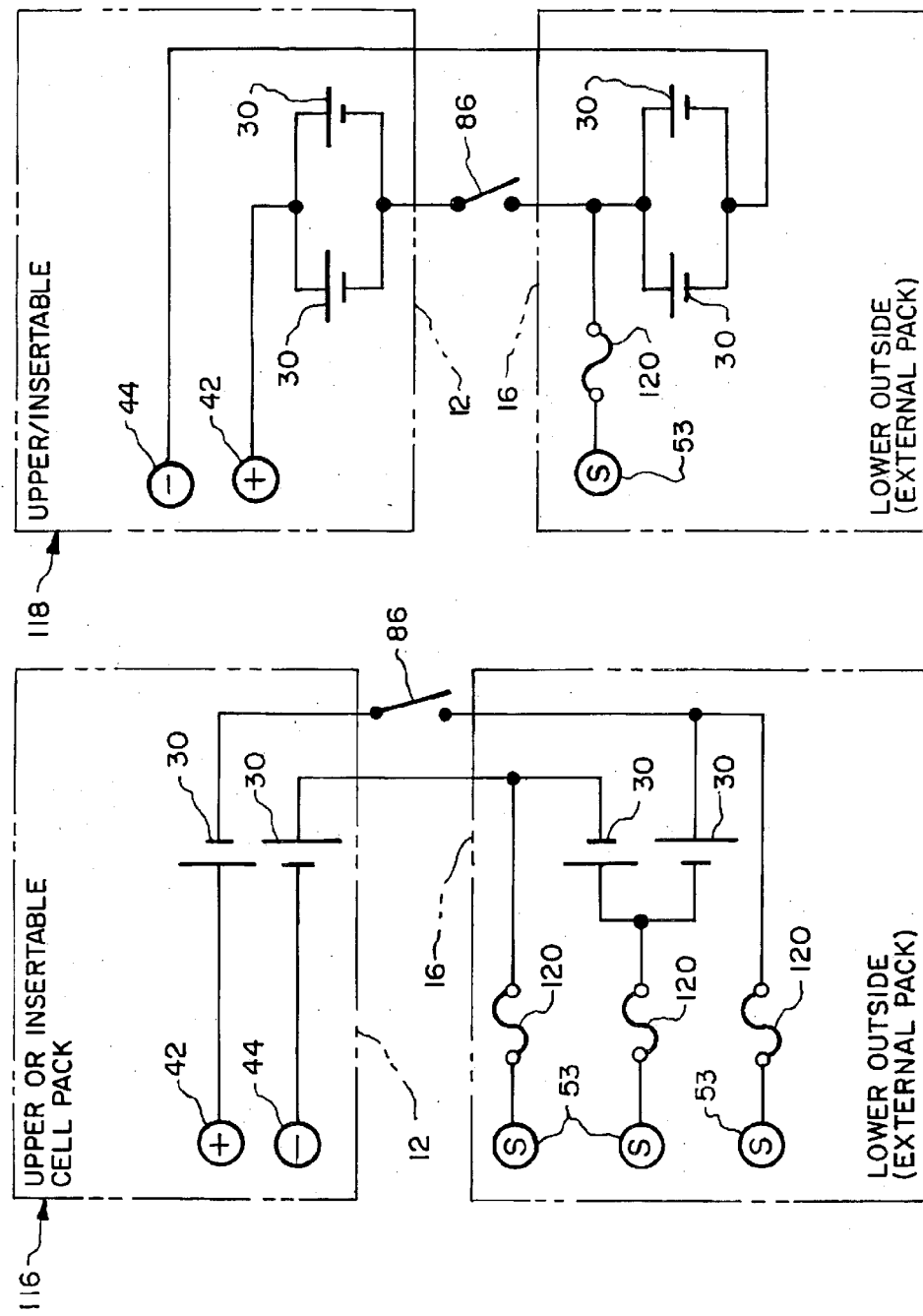

BATTERY HOLDER

BACKGROUND OF THE INVENTION

1. Field of the Invention

The present invention relates generally to battery holders and more particularly to increased capacity battery holders.

2. Background Art

Devices requiring portable power sources typically have compartments for housing batteries, battery packs, or battery holders, the battery packs or battery holders having batteries therein. Energy supplied to the devices, and, thus, the time durations that the devices may perform, without battery replacement and/or battery recharging, is typically limited to the batteries that are capable of being incorporated into the compartments within the devices and the energy densities of the batteries.

Designers and users of the devices usually prefer the devices to be available for long time durations, with minimal recharging and minimal resultant down times. However, the users in many cases do not have any options, but to replace or to recharge the batteries, the battery holders, or the battery packs, during critical periods, as a result of insufficient battery capacity for the tasks at hand. This results in undesirable and unnecessary down times, the batteries, battery holders, or the battery packs limiting use of the devices to the energy stored in the batteries within the battery compartments, and operating the devices only for time durations allowed by the energy densities of the batteries and the volume restrictions of the compartments within the devices.

Removable batteries, battery packs, and battery holders may be carried or stored while not installed in the devices from time to time, giving rise to the possibility that the batteries may be inadvertently shorted or the intended polarity of one or more cells reversed, thus, damaging the devices, and/or the batteries, and/or creating other safety implications in which exposed cell contacts may be shorted or polarity reversed in potentially dangerous environments.

An increased capacity battery holder, which allows a device to be used for a longer time duration than can be achieved from solely internally contained batteries, without recharging, replacement of the batteries, or connection to an external power source, is necessary. The battery holder should be capable of providing additional energy to the device, beyond internal space and volume limitations of the device. The battery holder may have additional battery holding capacity external to the device, but any additional battery holding capacity should be self contained within the battery holder. The battery holder should be safe and easy to use, and provide maximum energy output, with minimal damage to the batteries, during use, installation, transportation, and storage. The battery holder should be lightweight, transportable, durable, sturdy, long lasting, easy to use and handle, a portion of the battery holder being matingly removably attachable thereto the device, and optionally removably lockable to the device. The battery holder should also be simple, effective, quickly and easily accessible, of simple construction, easy to install and remove therefrom the device, require no assembly or minimal assembly, act as an additional means for holding and/or handling the device, and should be capable of forming an integral assembly with the device one with the other. The battery holder should have means for preventing inadvertent shorting and/or reversing polarity of the batteries, and optionally recharging means for recharging the batteries.

Different battery holders, associated accessories, connection devices, and safety devices have heretofore been known. However, none of the battery holders, accessories, connection devices, and safety devices alone or in combination adequately satisfies these aforementioned needs.

U.S. Pat. No. 6,169,857 (Kaneko) discloses a camera system including a camera, and an accessory to be secured to the camera, by means of a screw to an upper surface of the accessory and a threaded hole formed on a bottom surface of the camera. A portion of the accessory inserts thereinto the camera, and another portion of the accessory has a battery therein. At least first and second circuits are respectively provided in the camera and the accessory. First and second connectors, each of which are electrically connected to the first circuit, are provided on the bottom surface of the camera. The first and second connectors are arranged at opposite portions, with respect to the threaded holes on the bottom surface of the camera. Third and fourth connectors to be respectively connected to the first and second connectors are provided on the upper surface of the accessory. Each of the third and fourth connectors, which are electrically connected to the second circuit, are arranged at portions corresponding to the first and second connectors.

U.S. Pat. No. 5,325,143 (Kawano) discloses an adapter for a camera, having a mounting device for detachably mounting the adapter to the bottom of a camera, a release switch, a release signal transmitting device for releasing a shutter of the camera, in accordance with the operation of the release switch, and a battery.

U.S. Pat. No. 4,041,514 (Johnson) discloses a camera having a recess in an exterior surface thereof and a battery assembly having mounting structure adapted to be slidably received by the recess, for attaching the battery assembly to the camera to provide a source of energy for operating various components of the camera.

U.S. Pat. No. 5,654,870 (Havener) discloses a battery compartment for use with an electrical device having a circuit, which is powered by one or more batteries. The electrical device has a housing for substantially housing the circuit and a surface with an aperture therethrough. Each battery has first and second terminals. The battery compartment includes a slidable drawer for insertion through the housing aperture and receipt of the battery, a plurality of connectors for electrical connection to the battery's terminals, and a plurality of conductors to eclectically connect the connectors to the device's circuit. The drawer is movable between an open position exposing at least a portion of interior of the drawer, and a closed position. Electrical connection of the batteries to the circuit is maintained, whether the door is in the open or closed position.

U.S. Pat. No. 5,784,105 (Kawamura) discloses a video camera having a built-in secondary battery, a terminal used for connection with an external power source, and a main switch for controlling the supply of electric power to a circuit provided for a control system, and a signal processing system. The video camera is arranged, such that the circuit is connected to the built-in secondary battery or to the external power source, when the main switch is closed, and the built-in secondary battery can be connected to the external power source when the main switch is open.

U.S. Pat. Nos. 5,784,105 (4,409,645 Sloan) discloses a combination flashlight and auxiliary power pack, which accommodates spent instant photography film cartridges, and which includes a substantially flat battery. A battery and electrical carrier subassembly are accommodated within a housing, which serves as a covering shell, and does not have any of components of the device depending therefrom.

U.S. Pat. No. 6,225,777 (Garcia et al) discloses a latching mechanism for a removable cell battery pack. The latching mechanism includes a first member having a first catch, lateral catches, and a second member having a notch and lateral catches. In a first position, the first catch of the first member engages the notch of the second member. In a second position, the lateral catches of the first member engage the lateral catches of the second member.

U.S. Pat. No. 4,146,682 (Nakao) discloses a battery case holding mechanism, comprising an engaging means for engaging a battery case, which is detachably inserted into a concave formed in a body of an electric apparatus, and is biased so as to be detached from the concave, and disengagement preventing means, which is actuated when the engaging means operates and engages the battery case temporarily, in order to prevent the case from springing out of the concave.

U.S. Pat. No. 4,464,031 (Iwashita et al.) discloses a connection arrangement for camera system components, which has a camera attachable to a motor drive unit and a flash unit. The camera, the motor drive, and the flash unit each have respective batteries therein. In the camera, a detector produces a first signal before wind-up of the camera is completed. An interconnection terminal receives a second signal from the flash unit, before charging of the flash unit is completed. A disabling arrangement prevents shutter release, as long as one of the first and second signals is sensed.

U.S. Pat. No. 5,945,235 (Clanton et al.) discloses a holder for a pair of cylindrical battery cells, including a carrier which retains the batteries in parallel side-by-side relationship and in series electrical connection. The cells are installed into a housing longitudinally, and the housing is formed with guide channels for guiding and substantially surrounding the cells. Contact elements are provided at the ends of the guide channels for electrically connecting the battery cells to circuitry. The contact elements, which are internal to the holder, are substantially inaccessible to a user, even when the carrier is removed from the housing, thus minimizing electric shock hazard to the user.

U.S. Pat. No. 5,217,824 (Womack) discloses a battery holder of electrical non-conductive plastic, shorter than elongate batteries inserted therein, having an opening receiving the upper contact end of an elongate nickel-cadmium battery. A manually pressable release detent latching lever is pivotally mounted in the battery holder, and resiliently biased to the detent battery hold position. A cam surface on the detent is engaged at the top edge of the battery and case structure, and the detent is moved outwardly by the cam, as the battery assembly is inserted into the opening of the plastic battery holder, and then is snapped back into the detent hold state in the detent opening of the battery and the case assembly. A two path connection socket is provided with the battery holder and a resistor, contained within an upper chamber of the holder, for powering bulbs connected to the socket.

U.S. Pat. No. 6,071,639 (Bryant et al) discloses a battery cartridge, which holds a plurality of batteries for insertion into a battery cavity, comprising a housing, including first and second flexible holding members oppositely disposed with respect to one another on a first outer surface, the first and second holding members defining a cavity contoured to the shape of the batteries for receiving the batteries and securing thereto, a second inner surface having a recess formed therein, and a latching means coupled between the inner surface of the housing and a front cover portion and retractably extendable for engaging/disengaging slots positioned on a peripheral lip portion of the battery cavity for permitting insertion/ejection of the battery cartridge into/from the battery cavity.

U.S. Pat. No. 6,247,962 (DeSorbo) discloses a battery pack connection adapter, including an adapter plate for electrical connection between a battery charger and battery pack. The adapter plate includes a partially conductive strip. The pattern of conductive material on the strip establishes a circuit between underlying electrical contact pins on either the charger or the battery pack, so as to render the charger compatible with and capable of charging the battery pack.

U.S. Pat. No. 4,007,470 (Land) discloses a battery operated camera having a handle thereon formed in part by an external battery. U.S. Pat. No. 4,153,362 (Dietz et al) discloses a battery operated camera having means for mounting an external battery.

U.S. Pat. No. 5,015,546 (Dulaney et al) discloses a battery compartment for portable electrical equipment, such as computers, tape recorders, VCR recorders, camera flash equipment and other such devices.

U.S. Pat. No. 4,806,440 (Hahs, Jr. et al) discloses a battery holder, which accommodates D-cell batteries, and is suitable for substitution of conventional lantern batteries therewith. U.S. Pat. No. 6,271,644 (Okada et al) discloses a battery pack, capable of replacing a plurality of primary or secondary batteries, having at least one battery body, a battery holder that houses the battery body, and a pair of positive and negative terminals.

U.S. Pat. No. 6,266,491 (Carducci et al) discloses a camera frame assembly having a standby battery station. U.S. Pat. No. 5,517,277 (Goto et al) discloses a battery pack having a first battery and a second battery arranged separately from the first battery. U.S. Pat. No. 6,326,767 (Small, et al) discloses a rechargeable battery pack charging system with redundant safety systems.

For the foregoing reasons, there is a need for an increased capacity battery holder, which allows a device to be used for a longer time duration than can be achieved from solely internally contained batteries, without recharging, replacement of the batteries, or connection to an external power source. The battery holder should be capable of providing additional energy to the device, beyond internal space and volume limitations of the device. The battery holder may have additional battery holding capacity external to the device, but any additional battery holding capacity should be self contained within the battery holder. The battery holder should be safe and easy to use, and provide maximum energy output, with minimal damage to the batteries, during use, installation, transportation, and storage. The battery holder should be lightweight, transportable, durable, sturdy, long lasting, easy to use and handle, a portion of the battery holder being matingly removably attachable thereto the device, and optionally removably lockable to the device. The battery holder should also be simple, effective, quickly and easily accessible, of simple construction, easy to install and remove therefrom the device, require no assembly or minimal assembly, act as an additional means for holding and/or handling the device, and should be capable of forming an integral assembly with the device one with the other. The battery holder should have means for preventing inadvertent shorting and/or reversing polarity of the batteries, and optionally recharging means for recharging the batteries.

SUMMARY

The present invention is directed to an increased capacity battery holder, which allows a device to be used for a longer time duration than can be achieved from solely internally contained batteries, without recharging, replacement of the batteries, or connection to an external power source. The battery holder is capable of providing additional energy to the device, beyond internal space and volume limitations of the device. The battery holder has additional battery holding capacity external to the device, with the additional battery holding capacity self contained within the battery holder. The battery holder is safe and easy to use, and provides maximum energy output, with minimal damage to the batteries, during use, installation, transportation, and storage. The battery holder is lightweight, transportable, durable, sturdy, long lasting, easy to use and handle, a portion of the battery holder being matingly removably attachable thereto the device, and optionally removably lockable to the device. The battery holder is also simple, effective, quickly and easily accessible, of simple construction, easy to install and remove therefrom the device, requiring no assembly or minimal assembly, acts as an additional means for holding and/or handling the device, and is capable of forming an integral assembly with the device one with the other. The battery holder has means for preventing inadvertent shorting and/or reversing polarity of the batteries, and optionally recharging means for recharging the batteries.

A battery holder having features of the present invention comprises: a battery pack adapted to be interiorly disposed therein a device; a battery pack adapted to be exteriorly disposed thereto the device; a base adjoining the interiorly disposed battery pack and the exteriorly disposed battery pack; the interiorly disposed battery pack and the exteriorly disposed pack having a gap therebetween and being substantially parallel one to the other.

DRAWINGS

These and other features, aspects, and advantages of the present invention will become better understood with regard to the following description, appended claims, and accompanying drawings where:

FIG. 2 is a side view of the battery holder of FIG. 1;

FIG. 3 is a perspective view of the battery holder of FIG. 1 and a camera device;

FIG. 4 is a perspective view of the battery holder of FIG. 1 fastened thereto the camera device of FIG. 3;

FIG. 5 is a side section view of the battery holder of FIG. 1 and a portion of the camera device of FIG. 3, the battery holder fastened to the camera device;

FIG. 6 is a top section view of the battery holder of FIG. 1 and the camera device of FIG. 3, the battery holder fastened to the camera device;

FIG. 7 is an exploded cutaway perspective view of latch tabs of the battery holder of FIG. 1 and latch assembly of the camera device of FIG. 3;

FIG. 12 is a schematic diagram of the battery holder of FIG. 1;

FIG. 13 is an alternate schematic diagram of the battery holder of FIG. 1;

DESCRIPTION

Figure 1:
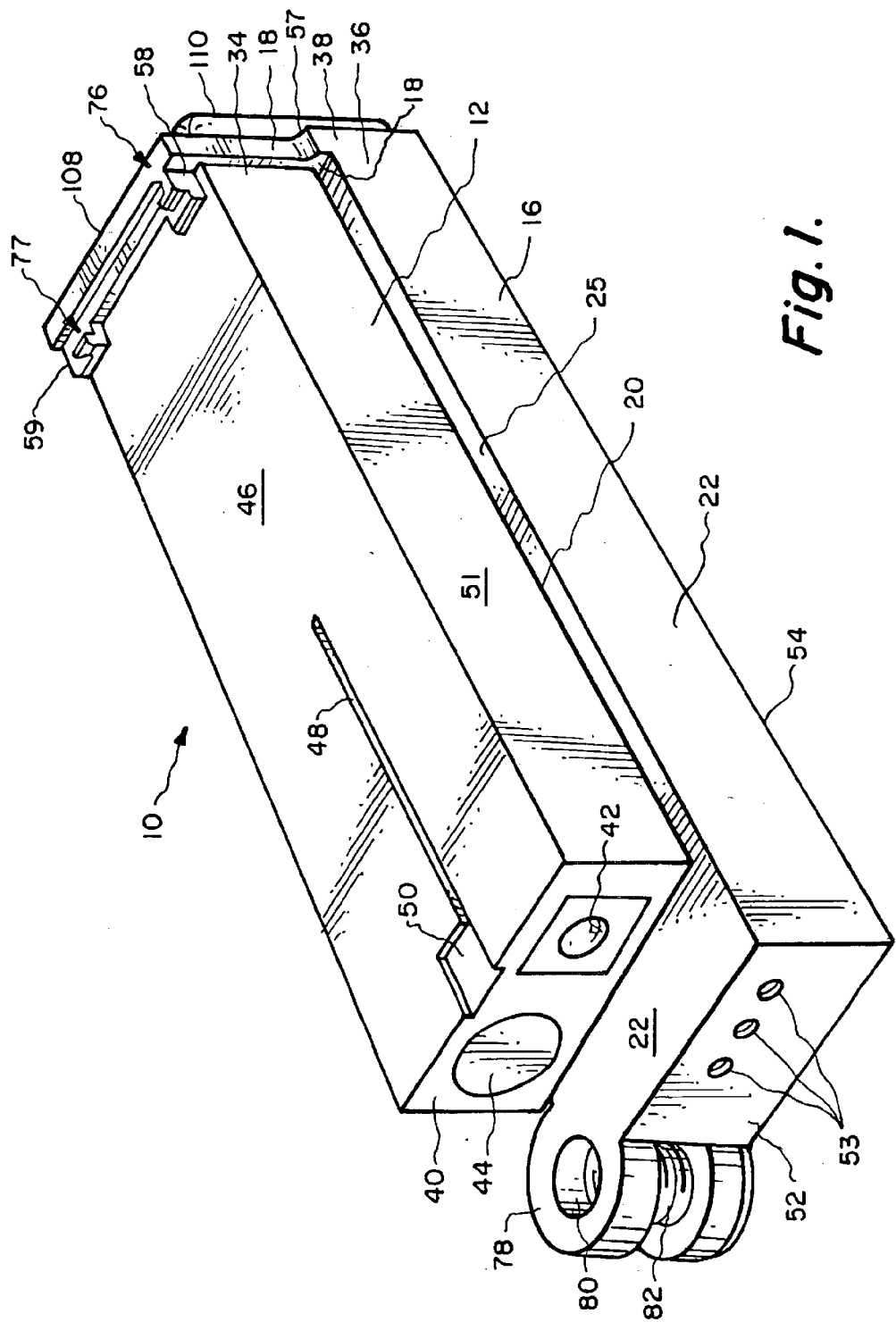
FIG. 1 is a perspective view of a battery holder, constructed in accordance with the present invention.
Figure 8:
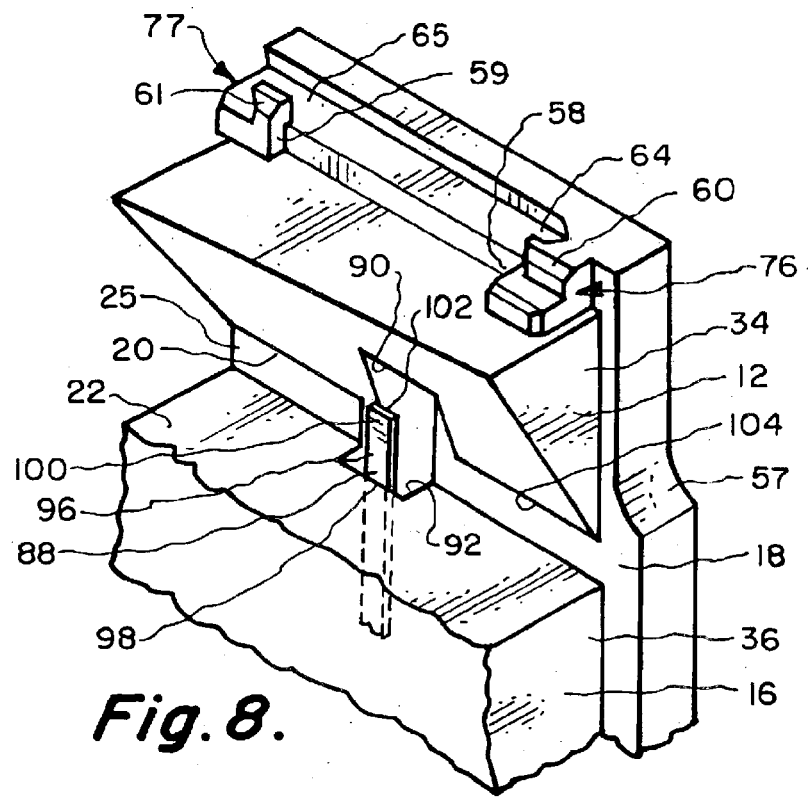
FIG. 8 is a cutaway perspective view of an interlock switch and a portion of the latch assembly of the battery holder of FIG. 1.
Figure 9:
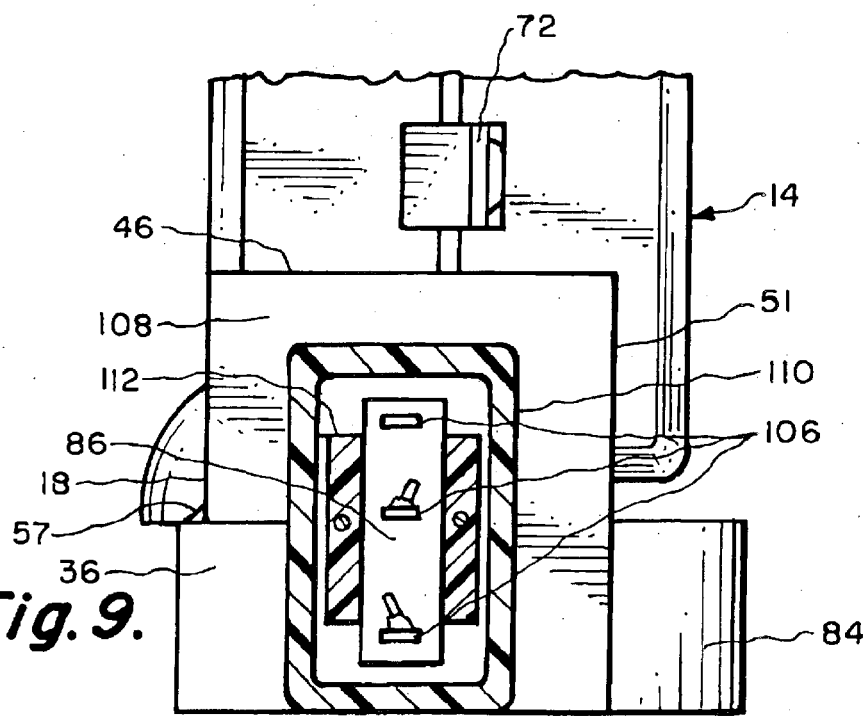
FIG. 9 is an end section view of the battery holder of FIG. 1 and a portion of the camera device of FIG. 3, the battery holder fastened to the camera device.
Figure 10:
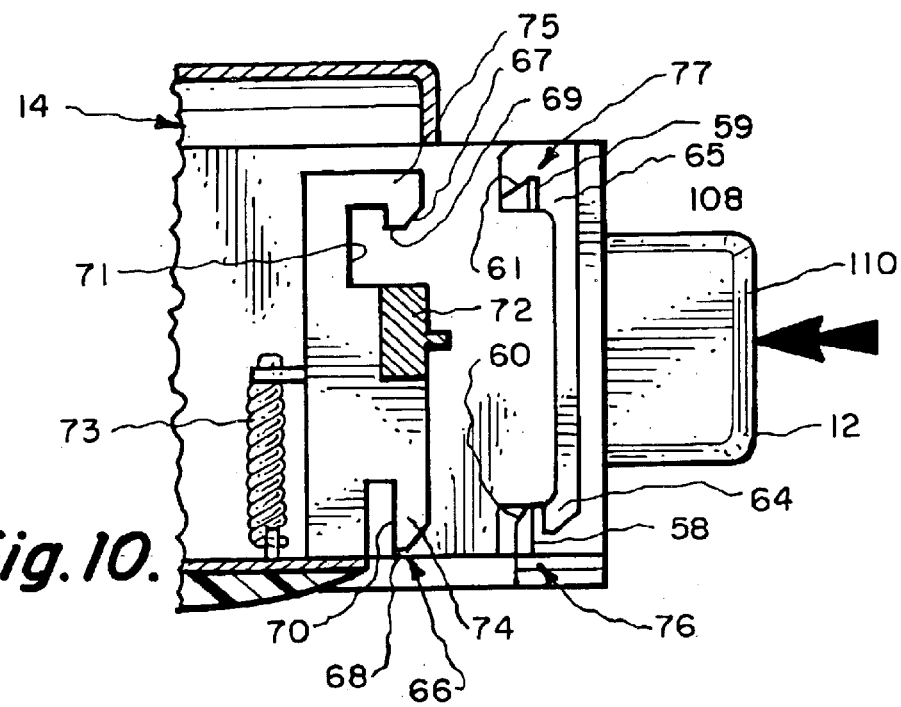
FIG. 10 is a top section view of the battery holder of FIG. 1 showing the battery holder being inserted thereinto the camera device of FIG. 3, the latch tabs of the battery holder, and the latch assembly of the camera device, prior to the latch tabs of the battery holder contacting the latch assembly of the camera device.
Figure 11:
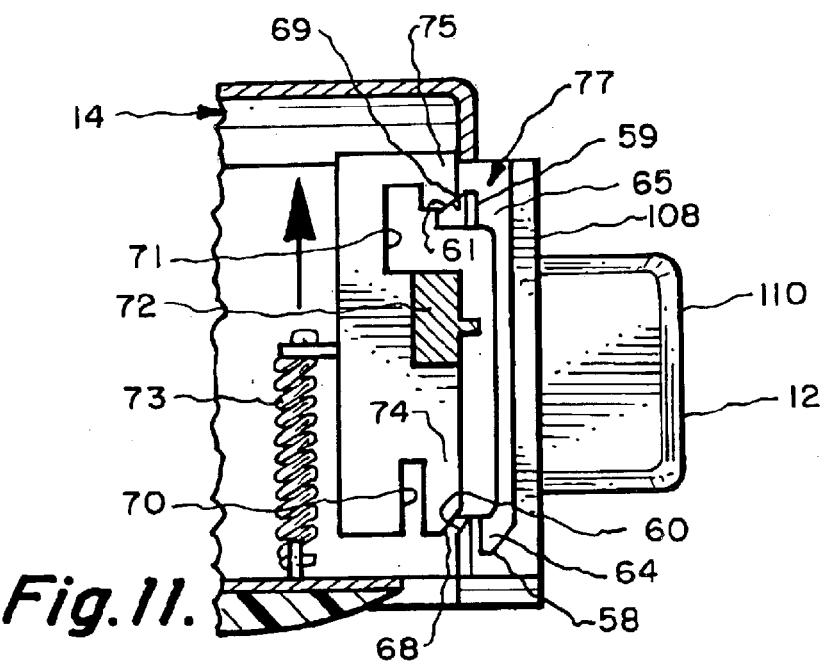
FIG. 11 is a top section view of the battery holder of FIG. 1 showing the battery holder being inserted thereinto the camera device of FIG. 3, the latch tabs of the battery holder and the latch assembly of the camera device contacting one another.

The preferred embodiments of the present invention will be described with reference to FIGS. 1–15 of the drawings. Identical elements in the various figures are identified with the same reference numbers.

FIGS. 1–13 show an embodiment of the present invention, a battery holder 10 having a battery pack 12 adapted to be removably insertable thereinto a camera 14 or other device, a battery pack 16 adapted to be exteriorly disposed adjacent the camera 14 or other device, and a base portion 18 adjoining the removably insertable battery pack 12 and the battery pack 16 adapted to be exteriorly disposed adjacent the camera 14 or other device. The battery holder 10 has wall 20 of the removably insertable battery pack 12 and wall 22 of the battery pack 16 adapted to be exteriorly disposed adjacent the camera 14 or other device preferably adapted to matingly receive wall 23 and edge 24 of the wall 23 of the camera 14 or other device therebetween. The battery holder 10 has gap 25 therebetween the wall 20 of the removably insertable battery pack 12 and the wall 22 of the battery pack 16 adapted to be exteriorly disposed adjacent the camera 14 or other device, the gap 25 extending to the base portion 18, the battery holder 10 being substantially U shaped. The base portion 18 of the battery holder 10 may be used to limit the extent of travel of the removably insertable battery pack 12 within the camera 14 or other device.

The battery pack 12 adapted to be removably insertable thereinto the camera 14 or other device and the battery pack 16 adapted to be exteriorly disposed adjacent the camera 14 or other device have compartments 26 and 28 therein, respectively, each of the compartments 26 and 28 having at least one battery 30 therein.

The wall 20 of the removably insertable battery pack 12 and the wall 22 of the battery pack 16 have the gap 25 therebetween preferably adapted to matingly receive the edge 24 and the wall 23 of the camera 14 or other device therebetween.

The battery pack 12 adapted to be removably insertable thereinto the camera 14 or other device and the battery pack 16 adapted to be exteriorly disposed adjacent the camera 14 or other device may each be substantially rectangular parallelepiped shaped or substantially cuboid shaped, with the wall 20 of the removably insertable battery pack 12 and the wall 22 of the battery pack 16 adapted to be exteriorly disposed adjacent the camera 14 or other device substantially parallel one to the other. Battery packs having other suitable shapes other than rectangular parallelepiped shaped or cuboid shaped battery packs, such as cylindrical or other suitable shapes, may be used depending upon the form factor required by the camera 14 or other device.

The removably insertable battery pack 12 has end 34 adjoined thereto the base portion 18, and the battery pack 16 adapted to be exteriorly disposed adjacent the camera 14 or other device has end 36 adjoined thereto the base portion 18, a portion 38 of the base portion 18 optionally being integral with the end 36. The removably insertable battery pack 12 has end 40 having positive and negative battery holder terminals 42 and 44, respectively, opposing the end 34 adjoined thereto the base portion 18. The removably insertable battery pack 12 also has exterior wall 46 having optional keyed notches 48 and 50 to facilitate matingly inserting the removably insertable battery pack 12 thereinto the camera 14 or other device, the exterior wall 46 opposing the wall 20, and opposing walls 51 substantially perpendicular to the exterior wall 46 and the wall 20, although other suitably shaped internally disposed battery packs, such as cylindrical or other suitable shapes, may be used. The battery pack 16 adapted to be exteriorly disposed adjacent the camera 14 or other device has end 52 having female battery charging sense terminals 53 opposing the end 36. The batteries 30 of the battery holder 10 may be charged therewith a battery charger, having male matingly removable battery terminals inserted thereinto the battery terminals 53, as needed The battery pack 16 adapted to be exteriorly disposed adjacent the camera 14 or other device also has exterior wall 54 opposing the wall 22, and opposing walls 56 substantially perpendicular to the exterior wall 54 and the wall 22, although other suitable shaped exteriorly disposed battery packs, such as cylindrical or other suitable shapes, may be used.

The removably insertable battery pack 12 and the battery pack 16 adapted to be exteriorly disposed adjacent the camera 14 or other device may each have different suitable shapes, depending upon requirements and applications under which the camera 14 or other devices are used. The removably insertable battery pack 12 and the battery pack 16 adapted to be exteriorly disposed adjacent the camera 14 or other device may, thus, have different size and/or shaped cross sections. The end 34 of the removably insertable battery pack 12 adjoined thereto the base portion 18 may, thus, have a different cross section, size, and/or shape from the end 36 of the battery pack 16 adapted to be exteriorly disposed adjacent the camera 14 or other device. The battery holder 10 of the present invention is shown for illustrative purposes, with the end 34 of the removably insertable battery pack 12 having a smaller cross section than the end 36 of the battery pack 16 adapted to be exteriorly disposed adjacent the camera 14 or other device, to facilitate insertion of the removably insertable battery pack 12 thereinto the camera 14 or other device and allow the battery pack 16 adapted to be exteriorly disposed adjacent the camera 14 or other device to contain a larger battery capacity than the removably insertable battery pack 12. The base portion 18 may, thus, have arcuate sections 57 as transitions, or other suitable shaped transitions, from one cross section to another, and allow the end 34 of the removably insertable battery pack 12 adjoined thereto the base portion 18 to have a different cross section, size, and/or shape from the end 36 of the battery pack 16 adapted to be exteriorly disposed adjacent the camera 14 or other device.

The base portion 18 of the battery holder 10 may have latching tabs 58 and 59 to facilitate matingly locking the removably insertable battery pack 12 therein the camera 14 or other device. The latching tabs 58 and 59 of the battery holder 10 may have oblique angle edges 60 and 61, and notches 64 and 65, respectively. The camera 14 or other device may have spring loaded latches 66 and 67, having oblique angle edge 68 and 69, respectively, and notches 70 and 71, respectively, latch control 72, and spring 73, associated therewith.

As the removably insertable battery pack 12 is inserted thereinto the camera 14 or other device, the oblique angle edges 60 and 61 of the battery holder 10 abut the oblique angle edges 68 and 69 of the camera 14 or other device, respectively, forcing the spring loaded latches 66 and 67 of the camera 14 or other device to open in a direction substantially perpendicular to the direction of motion of the battery holder 10 with respect to the camera 14 or other device. At the end of travel of the oblique angle edges 60 and 61 of the battery holder 10 with respect to the oblique angle edges 68 and 69 of the camera 14 or other device, tab portions 74 and 75 of the spring loaded latches 66 and 67 of the camera 14 or other device snap thereinto the notches 64 and 65 of the battery holder 10, respectively, and tab portions 76 and 77 of the battery holder 10 matingly fit therein the notches 70 and 71 of the spring loaded latches 66 and 67 of the camera 14 or other device, respectively. The spring loaded latches 66 and 67 of the camera 14 or other device and the latching tabs 58 and 59 of the battery holder 10 lock one to the other, and, thus, lock the battery holder 10 and the camera 14 or other device one to the other, at the end of travel of the removably insertable battery pack 12 therein the camera 14 or other device.

The battery holder 10 may be removably released therefrom the camera 14 or other device, by retractably pulling the latch control 72, which retracts the spring loaded latches 66 and 67, the spring 73 being compressed until the latch control 72 is released, and by retractably pulling the removably insertable battery pack 12 therefrom the camera 14 or other device, thus, releasing the battery holder 10 from the camera 14 or other device.

The battery pack 16 adapted to be exteriorly disposed adjacent the camera 14 or other device may also have corner portion 78 at the end 52, the corner portion 78 having hole 80 therethrough for fastener 82 to be inserted therethrough and fasten the battery pack 16 adapted to be exteriorly disposed adjacent the camera 14 or other device to the camera 14 or other device, as an alternative or in addition to the latching tabs 58 and 59,which facilitate matingly locking the removably insertable battery pack 12 therein the camera 14 or other device.

The battery pack 16 adapted to be exteriorly disposed adjacent the camera 14 or other device may also have tripod mount 83 having threaded hole 84 therein for inserting a threaded fastener therein and facilitate mounting the battery holder 10, which may be affixed to the camera 14 or other device, to a tripod or other device.

The battery holder 10 may optionally have interlock switch 86 mounted on the base portion 18, for connecting and disconnecting electrical output from the batteries 30 therein to the positive and negative battery holder terminals 42 and 44. The interlock switch 86 has hinged switch leaf control 88, which allows electrical output from the batteries 30 to be connected to the positive and negative battery holder terminals 42 and 44, when the hinged switch leaf control 88 contacts the edge 24 of the camera 14, at the end of travel of the removably insertable battery pack 12 within the camera 14 or other device, and disconnects the batteries 30 from the positive and negative battery holder terminals 42 and 44, when the battery holder 10 is removed therefrom the camera 14 or other device.

The removably insertable battery pack 12 has notch 90 substantially centrally located in the wall 20 adjacent the end 34 adjoined thereto the base portion 18; and the battery pack 16 adapted to be exteriorly disposed adjacent the camera 14 or other device has notch 92 substantially centrally located in the wall 22 adjacent the end 36 adjoined thereto the base portion 18, the notches 90 and 92 substantially aligned one with the other. The hinged switch leaf control 88 of the interlock switch 86 is located within the notches 90 and 92, and extends across the gap 25, with free end 96 of the hinged switch leaf control 88 adjacent edge 98 at the notch 92, and hinged end 100 adjacent edge 102 at the notch 90.

When the removably insertable battery pack 12 is inserted thereinto the camera 14 or other device, the hinged switch leaf control 88 contacts the edge 24 of the camera 14, at the end of travel of the removably insertable battery pack 12 within the camera 14 or other device, the free end 96 of the hinged switch leaf control 88 adjacent the edge 98 at the notch 92 moves toward side 104 of the base portion 18, turning the interlock switch 86 on at the hinged end 102, connecting the batteries 30 to the positive and negative battery holder terminals 42 and 44. When the battery holder 10 is removed therefrom the camera 14 or other device, the hinged switch leaf control 88 ceases to contact the edge 24 of the camera 14, the free end 96 of the hinged switch leaf control 88 adjacent the edge 98 at the notch 92 moves away from the side 104 of the base portion 18, turning the interlock switch 86 off at the hinged end 102, disconnecting the batteries 30 from the positive and negative battery holder terminals 42 and 44.

The interlock switch 86 has terminals 106 on side 108 of the base portion 18 opposing the removably insertable battery pack 12 and the battery pack 16 adapted to be exteriorly disposed adjacent the camera 14 or other device. The battery holder 10 has switch cover 110 for protecting the terminals 106 of the interlock switch 86, and optional mounting blocks 112 mounted on the side 108 of the base portion 18 for fastening the switch cover 110 thereto. The switch cover 110 may be alternatively affixed to the base portion 18 by other suitable means. The interlock switch 86 may be a micro switch having a hinged switch leaf control, as shown, or another suitable switch. The batteries 30 may be connected in series, as shown, in series-parallel, or in parallel.

The battery holder 10 has battery capacity and energy capacity greater than would otherwise be available with batteries in battery compartment 114 of the camera 14 or other device, alone. The battery holder 10 also has the interlock switch 86, for safety and preventing accidental discharge of the batteries 30.

The battery holder 10 is preferably of ABS plastic, but may be of thermoplastics, thermosetting polymers, rubber, metal, or other suitable material or combination thereof.

FIGS. 12 and 13 show schematic diagrams of alternate battery arrangements 116 and 118, respectively, of the battery holder 10, although other suitable battery arrangements may be used. The batteries 30 are connected in series and in series with a circuit of the camera 14 or other device in the battery arrangement 116 of FIG. 12. In the battery arrangement 118 of FIG. 13, the batteries 30 of the removably insertable battery pack 12 are connected in parallel one with the other, and the batteries 30 of the battery pack 16 adapted to be exteriorly disposed adjacent the camera 14 are connected in parallel one with the other, the parallel batteries 30 of the removably insertable battery pack 12 and the parallel batteries 30 of the battery pack 16 adapted to be exteriorly disposed adjacent the camera 14 being in series and in series with a circuit of the camera 14 or other device. A battery charger may be connected to the battery charging sense terminals 53 for charging the batteries 30, the sens terminals 53 being female socket contacts, which prevent inadvertent shorting of the sense terminals, when the battery charger is not connected to the battery holder 10. The interlock switch 86 and optional fuses 120 are also shown. The interlock 86 is in series with the batteries 30 of the removably insertable battery pack 12 and the batteries 30 of the battery pack 16 adapted to be exteriorly disposed adjacent the camera 14 in the battery arrangement 116 of FIG. 12 and in the battery arrangement 118 of FIG. 13. The optional fuses 120 are in series with the sense terminals 53 in the battery arrangement 116 and in the battery arrangement 118.

Figure 14:
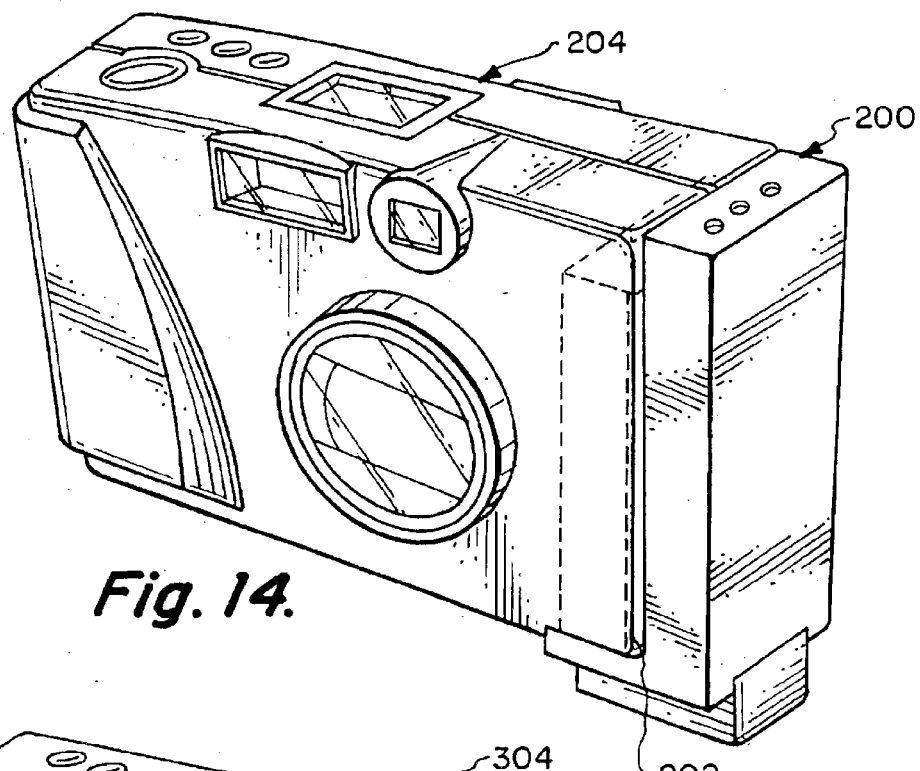
FIG. 14 is a perspective view of an alternate battery holder fastened thereto an alternate camera device.
Figure 15:
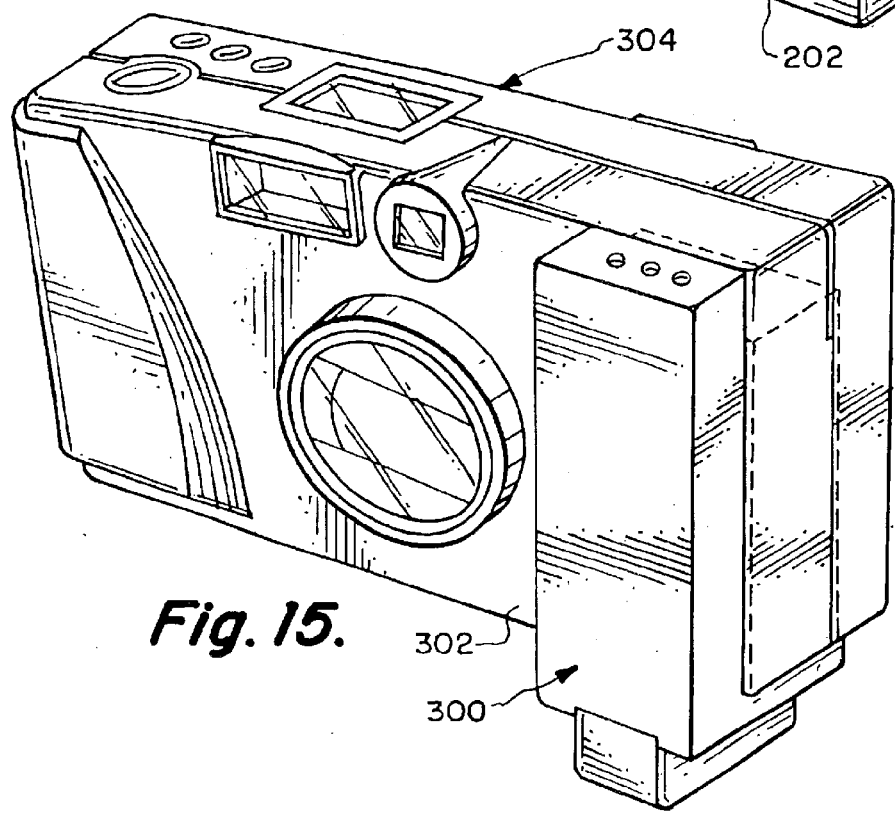
FIG. 15 is a perspective view of an alternate battery holder fastened thereto an alternate camera device.

FIGS. 14 and 15 show alternate embodiments of battery holders 200 and 300 which are substantially the same as the battery holder 10, except that the battery holder 200 is mounted adjacent side 202 of camera 204 or other device, and the battery holder 300 is mounted adjacent front portion 302 of camera 304 or other device.

Although the present invention has been described in considerable detail with reference to certain preferred versions thereof, other versions are possible. Therefore, the spirit and scope of the appended claims should not be limited to the description of the preferred versions contained herein.

What is claimed is:

1. A camera battery holder for use with a camera having a battery compartment having an exterior wall, comprising:
   a first battery pack;
   a second battery pack; and
   a base adjoining said first battery pack and said second battery pack;
   said first battery pack configured to be removably inserted into said battery compartment with said second battery pack exterior to said camera;
   said first battery pack and said second battery pack substantially parallel one to the other, having a gap therebetween, and configured to removably receive said exterior wall therebetween.

2. The camera battery holder according to claim 1, wherein said camera has at least one latch and said camera battery holder has at least one latching tab configured to have said at least one latch releasably hold thereto and releasably lock said camera battery holder and said camera one to the other.

3. The camera battery holder according to claim 1, wherein said camera has at least one spring loaded latch and said camera battery holder has at least one latching tab configured to force said at least one spring loaded latch about said at least one latching tab, releasably holding said spring loaded latch to said at least one latching tab and releasably locking said camera battery holder and said camera one to the other.

4. The camera battery holder according to claim 1, wherein said camera battery holder has an interlock switch, which connects said first battery pack and said second battery pack to the battery terminals of said camera battery holder when said first battery pack is inserted into said battery compartment, and disconnects said first battery pack and said second battery back from said battery terminals when said first battery pack is removed from said battery compartment.

5. The camera battery holder according to claim 1, wherein said camera battery holder has an interlock switch, which connects said first battery pack and said second battery pack to the battery terminals of said camera battery holder when said interlock switch contacts said wall, and disconnects said first battery pack and said second battery back from said battery terminals when said interlock switch is out of contact with said wall.

6. The camera battery holder according to claim 5, wherein said interlock switch comprises a hinged switch leaf control.

7. The camera battery holder according to claim 6, wherein said first battery pack has a first notch and said second battery pack has a second notch, said first notch and said second notch adjacent said base, said hinged switch leaf control within and extending between said first notch and said second notch.

8. The camera battery holder according to claim 1, wherein said first battery pack and said second battery pack are connected in parallel.

9. The camera battery holder according to claim 1, wherein said first battery pack and said second battery pack are connected in series.

10. The camera battery holder according to claim 1, wherein said first battery pack has at least two batteries and said second battery pack has at least two batteries, said first battery pack batteries connected in parallel and said second battery pack batteries connected in parallel.

11. The camera battery holder according to claim 1, wherein said first battery pack has at least two batteries and said second battery pack has at least two batteries, said first battery pack batteries connected in series and said second battery pack batteries connected in series.

12. The camera battery holder according to claim 1, wherein said first battery pack has battery terminals.

13. The camera battery holder according to claim 1, wherein said second battery pack has battery charging sense terminals.

14. The camera battery holder according to claim 12, wherein said second battery pack has battery charging sense terminals.

15. The camera battery holder according to claim 1, wherein said camera battery holder has a battery circuit, battery terminals, and battery charging sense terminals, said camera battery holder has at least one fuse connected between said battery circuit and at least one of said battery charging sense terminals.

16. The camera battery holder according to claim 1, wherein said second battery pack is adjacent the bottom of said camera, when said first battery pack is inserted into said battery compartment.

17. The camera battery holder according to claim 1, wherein said second battery pack is adjacent a side of said camera, when said first battery pack is inserted into said battery compartment.

18. The camera battery holder according to claim 1, wherein said second battery pack is adjacent the front of said camera, when said first battery pack is inserted into said battery compartment.

19. The camera battery holder according to claim 1, wherein said first battery pack is configured to be matingly inserted into said battery compartment.

20. The camera battery holder according to claim 1, wherein said first battery pack has at least one keyed notch configured to facilitate matingly inserting said first battery pack into said battery compartment.

21. The camera battery holder according to claim 1, wherein said first battery pack and said second battery pack matingly receive said exterior wall therebetween.

22. The camera battery holder according to claim 19, wherein said first battery pack and said second battery pack matingly receive said exterior wall therebetween.

23. The camera battery holder according to claim 1, wherein said camera battery holder is constructed of materials from the group consisting of metals, thermoplastics, thermosetting polymers, and rubber.

24. A camera battery holder for use with a camera having a battery compartment having an exterior wall and at least one latch, comprising:
 a first battery pack;
 a second battery pack; and
 a base adjoining said first battery pack and said second battery pack;
 said first battery pack configured to be removably inserted into said battery compartment with said second battery pack exterior to said camera;
 said first battery pack and said second battery pack substantially parallel one to the other, having a gap therebetween, and configured to removably receive said exterior wall therebetween;
 at least one latching tab configured to have said at least one latch releasably hold thereto and releasably lock said camera battery holder and said camera one to the other;
 an interlock switch, which connects said first battery pack and said second battery pack to the battery terminals of said camera battery holder when said first battery pack is inserted into said battery compartment, and disconnects said first battery pack and said second battery back from said battery terminals when said first battery pack is removed from said battery compartment.

25. The camera battery holder according to claim 24, wherein said first battery pack and said second battery pack matingly receive said exterior wall therebetween.

26. A camera battery holder for use with a camera having a battery compartment having an exterior wall and at least one spring loaded latch, comprising:
 a first battery pack;
 a second battery pack; and
 a base adjoining said first battery pack and said second battery pack;
 said first battery pack configured to be removably inserted into said battery compartment with said second battery pack exterior to said camera;
 said first battery pack and said second battery pack substantially parallel one to the other, having a gap therebetween, and configured to removably matingly receive said exterior wall therebetween;
 at least one latching tab configured to force said at least one spring loaded latch about said at least one latching tab, releasably holding said spring loaded latch to said at least one latching tab and releasably locking said camera battery holder and said camera one to the other;
 an interlock switch, which connects said first battery pack and said second battery pack to the battery terminals of said camera battery holder when said interlock switch contacts said wall, and disconnects said first battery pack and said second battery back from said battery terminals when said interlock switch is out of contact with said wall.

27. The camera battery holder according to claim 26, wherein said interlock switch comprises a hinged switch leaf control, said first battery pack has a first notch and said second battery pack has a second notch, said first notch and said second notch adjacent said base, said hinged switch leaf control within and extending between said first notch and said second notch.

* * * * *